United States Patent
Kracke

(10) Patent No.: US 11,858,616 B2
(45) Date of Patent: Jan. 2, 2024

(54) PANEL ACTUATION ASSEMBLY

(71) Applicant: Goodrich Actuation Systems Limited, Solihull (GB)

(72) Inventor: Jeremy Kracke, Stone Staffordshire (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 151 days.

(21) Appl. No.: 17/162,172

(22) Filed: Jan. 29, 2021

(65) Prior Publication Data

US 2021/0237854 A1 Aug. 5, 2021

(30) Foreign Application Priority Data

Jan. 31, 2020 (EP) .................................... 20275022

(51) Int. Cl.
- *B64C 9/22* (2006.01)
- *B64C 13/00* (2006.01)
- *B64C 3/28* (2006.01)
- *B64C 3/38* (2006.01)
- *B64C 9/16* (2006.01)

(52) U.S. Cl.
CPC ................ *B64C 13/00* (2013.01); *B64C 3/28* (2013.01); *B64C 3/38* (2013.01); *B64C 9/16* (2013.01); *B64C 9/22* (2013.01)

(58) Field of Classification Search
CPC .... B64C 9/22; B64C 9/24; B64C 9/26; B64C 9/16; B64C 9/18; B64C 9/20
See application file for complete search history.

(56) References Cited

U.S. PATENT DOCUMENTS

| 4,471,928 | A  | * | 9/1984 | Cole | .................. | B64C 9/20 |
| | | | | | | 244/215 |
| 6,467,733 | B1 | * | 10/2002 | Young | ................... | B64C 13/34 |
| | | | | | | 244/90 R |
| 9,771,141 | B2 | | 9/2017 | Moser et al. | | |

(Continued)

FOREIGN PATENT DOCUMENTS

| DE | 102010047540 A1 | 4/2012 |
| DE | 102014019134 A1 | 6/2016 |

(Continued)

OTHER PUBLICATIONS

European Search Report for Application No. 20275022.0 dated Aug. 7, 2020, 10 pages.

*Primary Examiner* — Nicholas McFall
*Assistant Examiner* — Terri L Filosi
(74) *Attorney, Agent, or Firm* — CANTOR COLBURN LLP

(57) ABSTRACT

An actuator system for controlling movement of a plurality of panels. The system includes two lifting mechanisms connected to each panel at two separate locations on the panel, and, for each panel: an actuator in engagement with a first of the lifting mechanisms to drive the lifting mechanism to move the panel, and a torque tube having a first end in engagement with the actuator so as to be rotated by the actuator as the actuator drives the lifting mechanism, the torque tube having a second end in engagement with the other of the two lifting mechanisms to drive the lifting mechanism due to rotation of the torque tube.

9 Claims, 4 Drawing Sheets

(56) References Cited

U.S. PATENT DOCUMENTS

| | | | | |
|---|---|---|---|---|
| 2004/0004163 A1* | 1/2004 | Davies | .................... | B64C 13/32 |
| | | | | 244/217 |
| 2011/0001015 A1* | 1/2011 | Kracke | .................... | B64C 9/02 |
| | | | | 244/99.3 |
| 2011/0036944 A1* | 2/2011 | Mann | ........................ | B64C 9/22 |
| | | | | 244/99.3 |
| 2019/0210712 A1* | 7/2019 | Schlipf | ................... | B64C 13/50 |
| 2019/0226530 A1* | 7/2019 | Meyer | ....................... | B64C 9/16 |

FOREIGN PATENT DOCUMENTS

| | | | |
|---|---|---|---|
| EP | 2202146 | A2 | 6/2010 |
| GB | 2390344 | A | 1/2004 |

\* cited by examiner

US 11,858,616 B2

PANEL ACTUATION ASSEMBLY

FOREIGN PRIORITY

This application claims priority to European Patent Application No. 20275022.0 filed Jan. 31, 2020, the entire contents of which is incorporated herein by reference.

TECHNICAL FIELD

The present disclosure is concerned with an actuation system for moveable panels in an aircraft.

BACKGROUND

Aircraft contain many moveable parts including moveable surfaces such as slats, flaps and other panels that are moved to different positions by means of actuators responding to control commands. Movement of these surfaces affects the flight of the aircraft.

Tubes generally connect actuators to the moving parts and gearing is provided at the actuators to step down the power.

One example of the use of actuators to move moveable parts on an aircraft is the high lift slat panels provide on the leading edge of the aircraft wings to control lift of the aircraft, or flap panels on the trailing edge of an aircraft wing. The actuators raise and lower these panels as commanded. Typically, several panels will be provided along the length of the wing and each panel will have two actuators to control its lifting/lowering movement.

It is also typical to use different strength actuators along the length of the wing as the loads on the panels due to aerodynamics are different.

The actuators used in such systems are complex and expensive to manufacture. There is, therefore, a desire to reduce the overall number of actuators without adversely affecting performance and safety.

SUMMARY

According to the present disclosure, there is provided an actuator system for controlling movement of a plurality of panels, comprising two or more lifting mechanisms connected to each panel at two or more separate locations on the panel, an actuator in engagement with a first of the lifting mechanisms to drive the lifting mechanism to move the panel, and a torque tube having a first end in engagement with the actuator so as to be rotated by the actuator as the actuator drives the lifting mechanism, the torque tube having a second end in engagement with the or another of the two or more lifting mechanisms to drive the lifting mechanism due to rotation of the torque tube.

The lifting mechanisms each preferably comprise a rack and pinion arrangement with a rack attached to the panel and the pinion driven by the actuator, and wherein the pinion of the first lifting mechanism is in engagement with the actuator and the pinion of the other lifting mechanism is engaged by the second end of the torque tube.

The torque tube can be a carbon fiber tube.

In some embodiments, more than two lifting mechanisms are provided at respective separate locations on the panel; the actuator may be in engagement with a first of the lifting mechanisms and to drive the other lifting mechanisms via respective torque tubes.

In another aspect, there is provided an aircraft wing comprising a plurality of panels along a leading edge and an actuator system as described above.

DETAILED DESCRIPTION

The described embodiments are by way of example only. The scope of this disclosure is limited only by the claims.

Existing actuator systems will first be described with reference to FIGS. 1 and 2. The description relates to the slat panels on the leading edge of the aircraft wing but this is just one example and the same or similar principles apply to other moveable panels.

Figure 2:
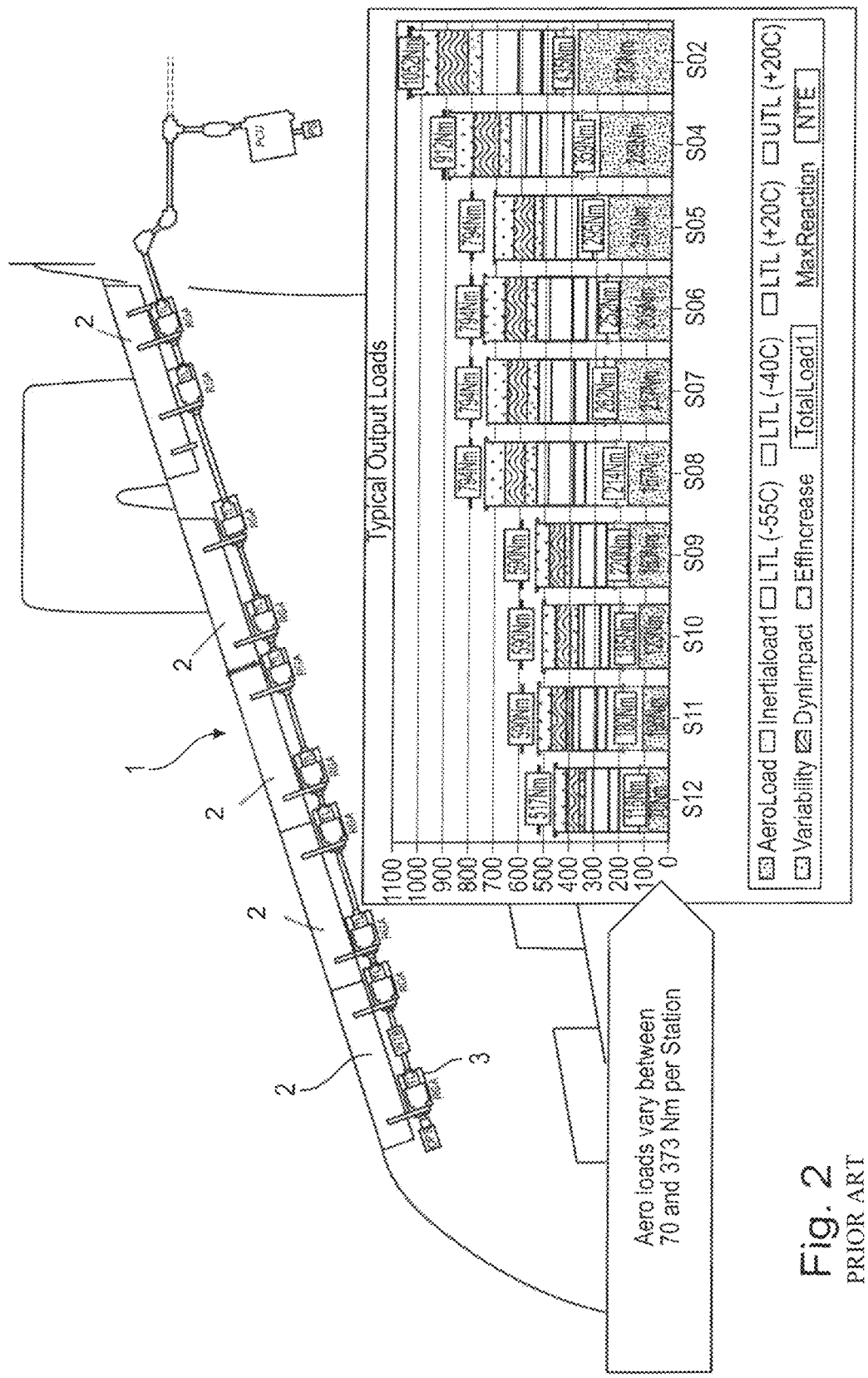
FIG. 2 shows a typical arrangement of panels and actuators on the leading edge of an aircraft together with a chart showing example loads.

FIG. 2 shows a typical leading edge 1 having five moveable panels 2. The movement of each panel is caused by two geared actuators 3 at two stations spaced apart on the panel—i.e. two actuators are provided per panel—one actuator at or close to each end of the panel. The actuators are controlled by a power control unit (PCU) which provides output control signals to the actuators according to a command e.g. from the pilot or flight control system which determines how much and in what direction the panels are moved by the actuators.

As can be seen in the chart the more inboard panels are subjected to a higher load than the more outboard panels and so the output requirements of the actuators vary.

Figure 1:
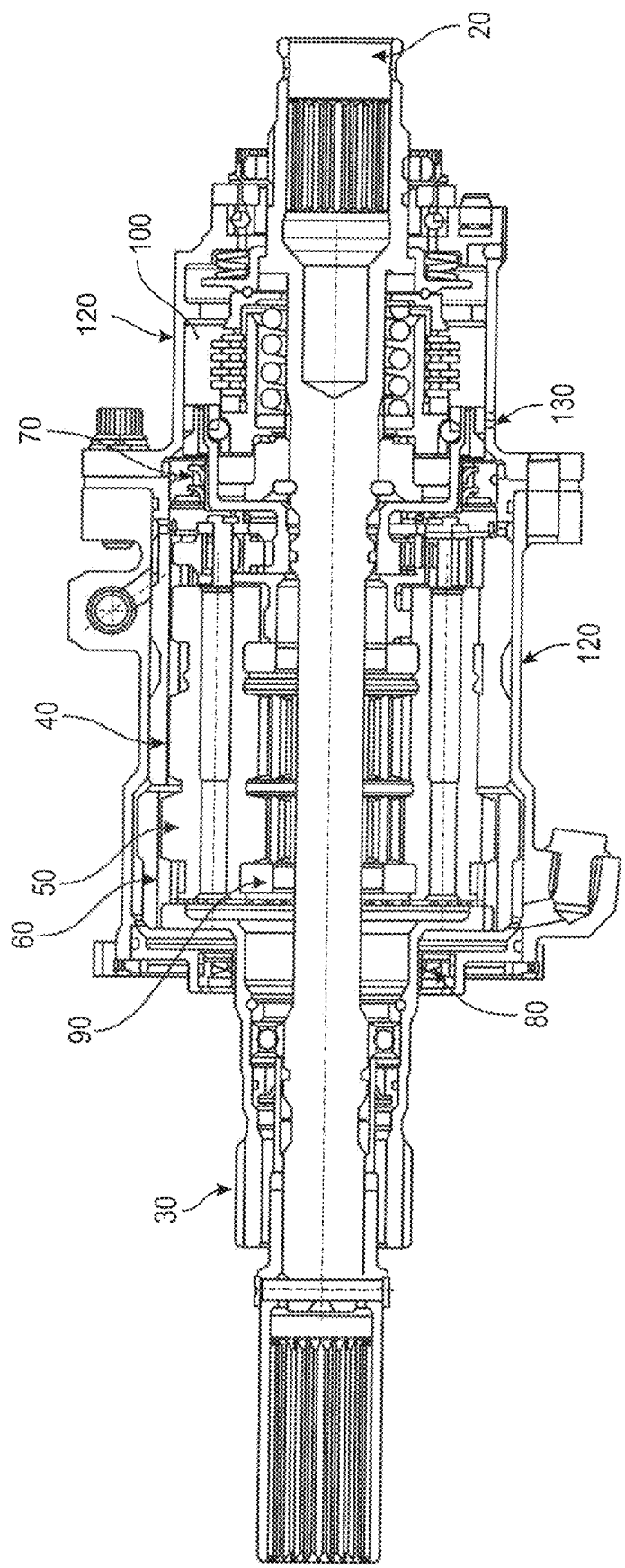
FIG. 1 is a sectional view of a typical actuator for causing movement of a moveable panel on an aircraft.

FIG. 1 shows in more detail the structure of a typical actuator having an input shaft 20 which rotates responsive to the command and causes a stepped-down rotation of an output shaft 30 via a gear mechanism. In the example shown, the gear mechanism comprises an earth ring gear 40, pinion gears 50 and an output ring gear 60. Seals 70, 80 prevent leakage of hydraulic fluid and lubricant. Support rings 90 may be provided to support rotation of the actuator components. A torque limiter 100 is provided to limit torque from the input shaft. The torque limiter is provided in a housing 110 and the gearing is provided in an actuator housing 120. A vent 130 may also be provided. Such actuator structures are known and will not be described further. Other known actuator structures may also be used.

In a typical system, the panels 2 are deployed using a known rack and pinion arrangement on a curved track. A pinion is provided at each actuator station or location on the panel. The actuators are controlled, by the PCU, to move the pinion to cause the desired panel movement.

As mentioned above, the actuators used in such systems are expensive and complex.

According to the present disclosure, a system is provided having only a single actuator per panel. A torque tube is provided between the pinions at the two panel stations, that drive the racks to move the panels. The sole actuator is provided as usual at the first station and drives the pinion at that station. The other pinion is driven by rotation of a high torque tube, e.g. a carbon fiber tube, that is attached to and rotated by the actuator.

While any high torque material could be used for the tube to achieve advantages in cost savings due to fewer actuators, advancements in carbon fiber tube technology mean that such tubes can be manufactured more easily and at lower cost.

Figure 3:
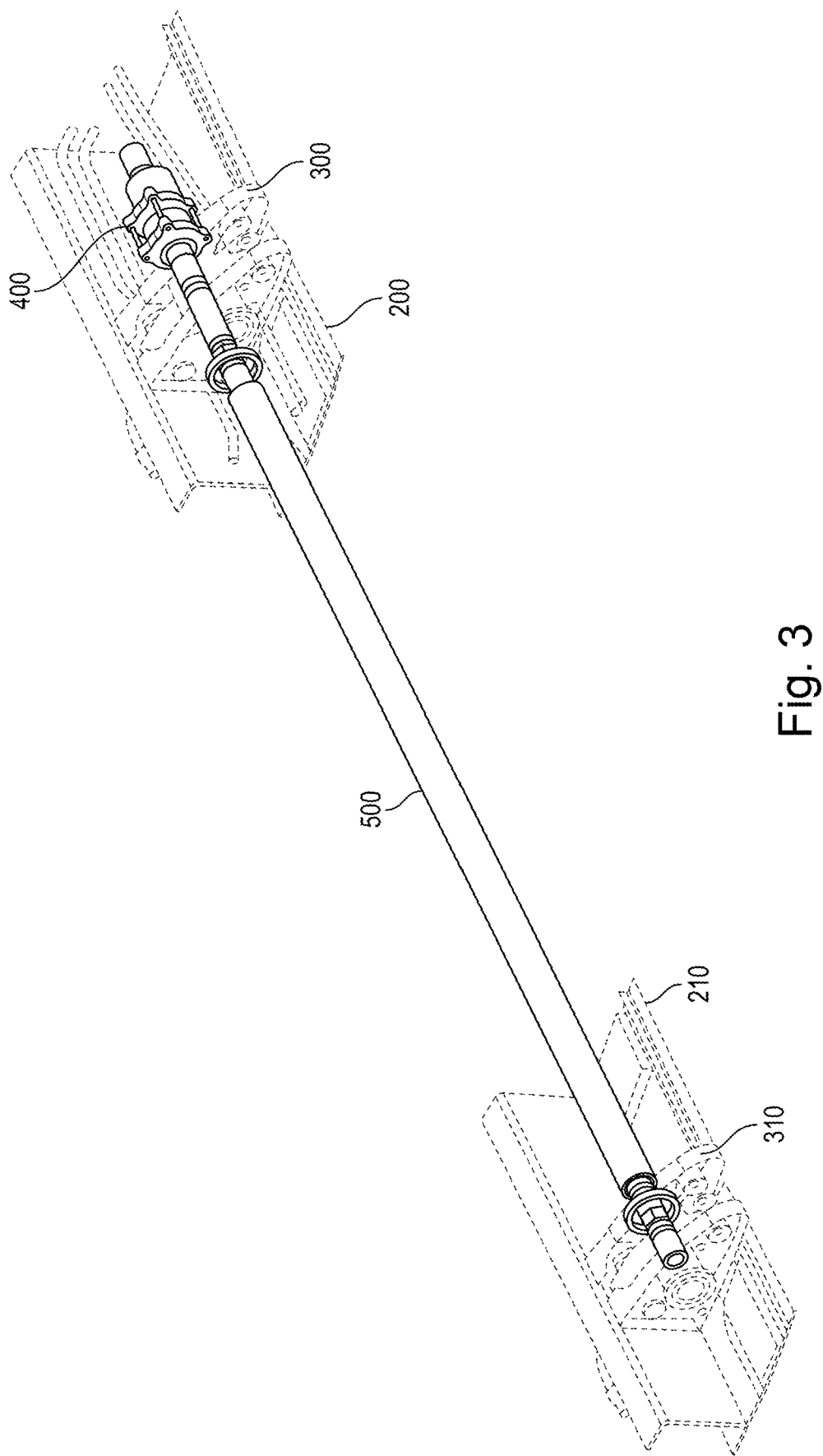
FIG. 3 is a perspective view of part of a system according to the present disclosure.

The system can be seen in FIG. 3 showing two stations 200, 210 of a moveable panel (not shown in FIG. 3) on an aircraft wing. At each station a drive mechanism 300, 310 is provided to move the panel responsive to the actuator. The drive mechanism here is a typical rack and pinion arrangement but other mechanisms are feasible.

An actuator 400 is provided at the first station 200 and drives the drive mechanism. A torque tube 500 connects the actuator at the first station to the drive mechanism at the second station 210 in torque transmitting connection.

The torque tube 500 will rotate at the output speed of the actuator 400 to move the pinion at the second station in the same way as the first pinion at the first station is moved by the actuator 400.

Figure 4:
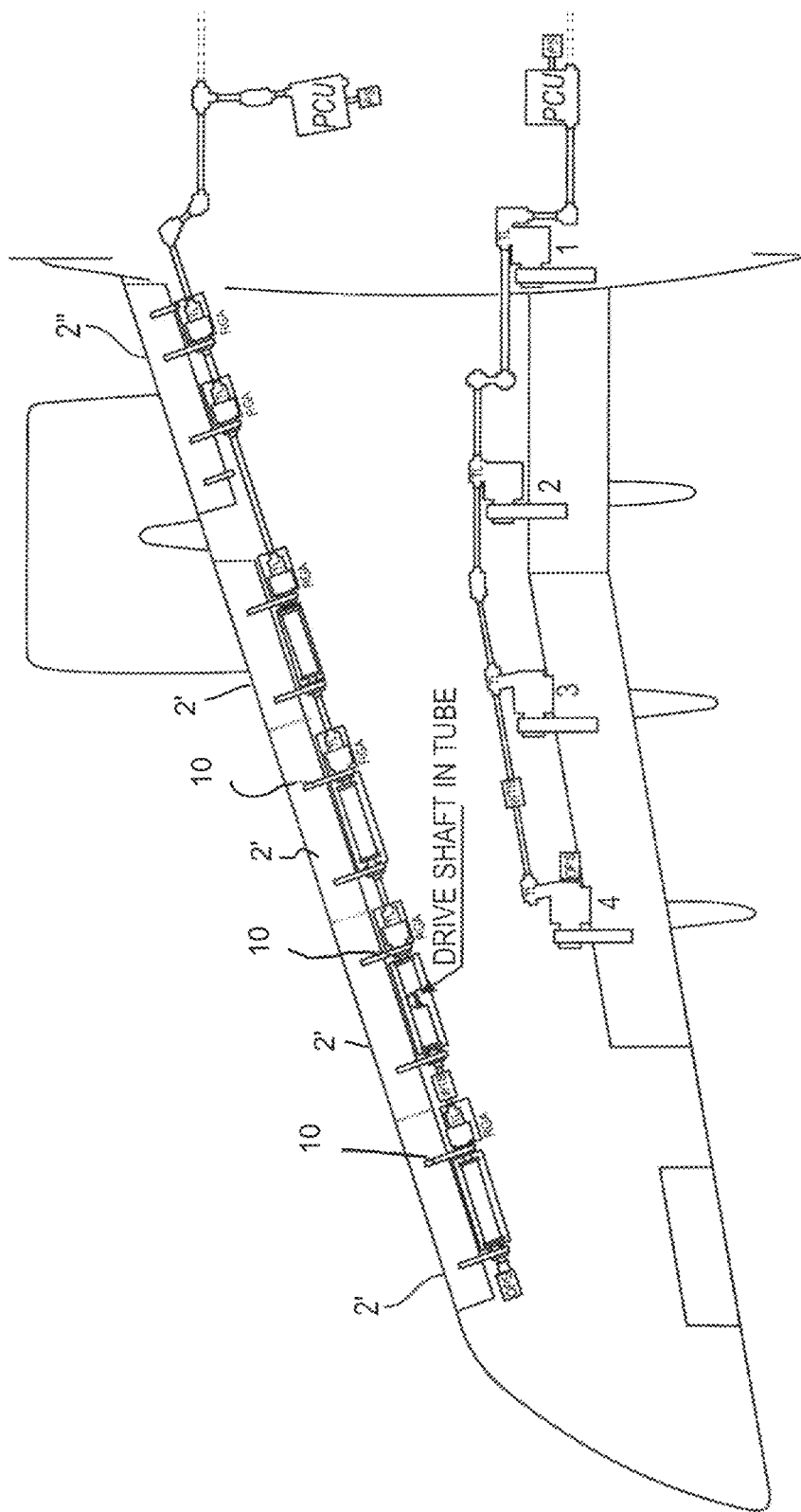
FIG. 4 shows an arrangement of panels and actuators on the leading edge of an aircraft according to this disclosure.

FIG. 4 shows how the system of this disclosure results in a reduced number of actuators per wing. Here, the wing has 5 panels 2'. The innermost panel 2" which has the greatest loading, still has two actuators, but the other panels all have only one actuator each with a torque tube connecting the actuator to a second station of the respective panel.

The system of this disclosure is thus much less expensive and easier to manufacture and industrialise than conventional systems. The smaller structure of the tube compared to another actuator also means that the wing has less drag and less inertia than when two actuators are present.

The invention claimed is:

1. A panel actuation assembly comprising:
   a plurality of movable panels; and
   an actuator system for controlling movement of a plurality of panels, the actuator system comprising:
     two or more drive mechanisms connected to each panel at two or more separate locations on the panel; and
     for each panel:
       a sole actuator per panel directly connected to a pinion of a first of the drive mechanisms to drive the drive mechanism, via the pinion, to move the panel, and
       a torque tube having a first end in engagement with the sole actuator so as to be rotated by the sole actuator as the sole actuator drives the first of the drive mechanisms, the torque tube having a second end in engagement with a second of the two or more drive mechanisms to drive the second drive mechanism due to rotation of the torque tube such that the first and second drive mechanisms are driven by the sole actuator;
   wherein the first and second drive mechanisms each comprise a rack and pinion arrangement with a rack attached to the panel and the pinion driven by the sole actuator, and wherein the pinion of the first drive mechanism is directly connected to the sole actuator and the pinion of the second drive mechanism is engaged by the second end of the torque tube.

2. The panel actuation assembly as claimed in claim 1, wherein torque tube is a carbon fiber tube.

3. The panel actuation assembly as claimed in claim 1, wherein the sole actuator of each panel is a sole geared actuator comprising an input shaft and an output shaft connected by a gear mechanism.

4. The panel actuation assembly as claimed in claim 1, further comprising a control unit to provide a control signal to the sole actuator.

5. The panel actuation assembly as claimed in claim 4, wherein the control unit provides the control signal in response to a command from a pilot or a flight control system.

6. The panel actuation assembly as claimed in claim 1,
   wherein more than two drive mechanisms are provided at respective separate locations on the panel; the sole actuator is directly connected to the first drive mechanism and to drive the second drive mechanism via respective torque tubes.

7. The panel actuation assembly as claimed in claim 6, comprising:
   three drive mechanisms at three separate locations on the panel, wherein the sole actuator is directly connected to the first drive mechanism; and
   a first torque tube connecting the sole actuator to the second drive mechanism and a second torque tube connecting the sole actuator to a third drive mechanism of the three drive mechanisms.

8. An aircraft wing having a leading edge and a trailing edge, the aircraft wing comprising:
   a plurality of panels along the leading edge or the trailing edge; and
   the panel actuation assembly as claimed in claim 1.

9. An aircraft comprising:
   two aircraft wings as claimed in claim 8.

* * * * *